US009740513B2

(12) United States Patent
Gatherer et al.

(10) Patent No.: US 9,740,513 B2
(45) Date of Patent: Aug. 22, 2017

(54) SYSTEM AND METHOD FOR REAL TIME VIRTUALIZATION

(71) Applicant: Futurewei Technologies, Inc., Plano, TX (US)

(72) Inventors: Alan Gatherer, Richardson, TX (US); Debashis Bhattacharya, Plano, TX (US); Anthony C. K. Soong, Plano, TX (US)

(73) Assignee: FUTUREWEI TECHNOLOGIES, INC., Plano, TX (US)

( * ) Notice: Subject to any disclaimer, the term of this patent is extended or adjusted under 35 U.S.C. 154(b) by 0 days.

(21) Appl. No.: 14/730,929

(22) Filed: Jun. 4, 2015

(65) Prior Publication Data
US 2015/0355919 A1    Dec. 10, 2015

Related U.S. Application Data

(60) Provisional application No. 62/008,382, filed on Jun. 5, 2014.

(51) Int. Cl.
*G06F 9/455*    (2006.01)
*G06F 9/48*    (2006.01)
*G06F 9/52*    (2006.01)
*G06F 9/50*    (2006.01)
*G06F 9/54*    (2006.01)

(52) U.S. Cl.
CPC ............ *G06F 9/455* (2013.01); *G06F 9/4881* (2013.01); *G06F 9/5005* (2013.01); *G06F 9/5077* (2013.01); *G06F 9/52* (2013.01); *G06F 9/545* (2013.01)

(58) Field of Classification Search
CPC ..................................... G06F 9/4881

USPC ..................... 718/1, 102, 103, 107
See application file for complete search history.

(56) References Cited

U.S. PATENT DOCUMENTS

| 5,023,907 | A | * | 6/1991 | Johnson | G06F 21/105 710/200 |
| 5,556,798 | A | * | 9/1996 | Hong | H01L 27/11521 257/316 |
| 5,615,121 | A | * | 3/1997 | Babayev | G06Q 10/06 700/100 |
| 6,205,524 | B1 | * | 3/2001 | Ng | G06F 13/161 345/541 |
| 6,260,068 | B1 | * | 7/2001 | Zalewski | G06F 9/5077 707/999.01 |

(Continued)

FOREIGN PATENT DOCUMENTS

WO    2006026673 A2    3/2006

OTHER PUBLICATIONS

Stankovic et al., "Real-Time Operating Systems", 2004.*

(Continued)

*Primary Examiner* — Phillip H Nguyen
(74) *Attorney, Agent, or Firm* — Futurewei Technologies, Inc.

(57) ABSTRACT

A system includes a plurality of compute modules and a first processor configured to implement a virtualization layer, where the virtualization layer is configured to support real time jobs. The system also includes a hardware support layer coupled between the plurality of compute modules and the virtualization layer, where the hardware support layer is configured to provide an interface between the virtualization layer and the plurality of compute modules.

18 Claims, 6 Drawing Sheets

(56) References Cited

U.S. PATENT DOCUMENTS

| | | | |
|---|---|---|---|
| 6,490,611 B1 * | 12/2002 | Shen | G06F 9/4887 718/100 |
| 6,598,068 B1 * | 7/2003 | Clark | G06F 9/52 718/104 |
| 7,519,665 B1 * | 4/2009 | Shimada | H04M 3/523 370/395.42 |
| 8,286,174 B1 * | 10/2012 | Schmidt | G06F 9/5077 709/226 |
| 2005/0036159 A1 | 2/2005 | Sharma et al. | |
| 2005/0138300 A1 * | 6/2005 | Chen | G06F 13/1631 711/151 |
| 2005/0256892 A1 * | 11/2005 | Harken | G06F 17/303 |
| 2006/0212869 A1 * | 9/2006 | Bril | G06F 9/4881 718/102 |
| 2006/0218550 A1 * | 9/2006 | Tao | G06F 9/462 718/1 |
| 2007/0089114 A1 * | 4/2007 | MacInnis | G06F 9/4887 718/103 |
| 2007/0133518 A1 * | 6/2007 | Ben-David | G10L 15/30 370/352 |
| 2007/0157211 A1 | 7/2007 | Wang et al. | |
| 2007/0168642 A1 * | 7/2007 | Wilson | G06F 12/08 711/206 |
| 2008/0155537 A1 * | 6/2008 | Dinda | G06F 9/4887 718/1 |
| 2008/0235423 A1 * | 9/2008 | Mace | G06F 13/364 710/113 |
| 2009/0100429 A1 * | 4/2009 | Thoelke | G06F 12/1009 718/102 |
| 2010/0228898 A1 * | 9/2010 | Aranguren | G06F 3/061 710/56 |
| 2011/0239220 A1 * | 9/2011 | Gibson | G06F 9/4887 718/103 |
| 2012/0093047 A1 * | 4/2012 | Khawer | G06F 9/5011 370/310 |
| 2012/0096470 A1 | 4/2012 | Bartfai-Walcott et al. | |
| 2013/0145375 A1 | 6/2013 | Kang | |
| 2013/0288741 A1 | 10/2013 | Sjadieh et al. | |
| 2013/0306276 A1 | 11/2013 | Duchesneau | |
| 2014/0201738 A1 * | 7/2014 | Choi | G06F 9/45533 718/1 |
| 2014/0376555 A1 * | 12/2014 | Choi | H04L 49/70 370/395.53 |
| 2016/0057075 A1 * | 2/2016 | Parikh | H04L 47/762 709/226 |

OTHER PUBLICATIONS

Banachowski et al., "Integrating Best-effort Scheduling into a Real-time System", 2004.*

Li et al., "An Autonomic Management Architecture for SDN-based Multi-service Network ", 2013.*

Ravindran et al., "Towards Software Defined ICN based Edge-Cloud Services", 2013.*

Li et al., "Toward Software-Defined Cellular Networks", 2012.*

Li et al., "An Automatic Management Architecture for SDN-based Multi-service Network", 2013.*

Ravindran et al., "Toward Software Defined ICN based Edge-Cloud Services", 2013.*

International Search Report and Written Opinion of Patent Cooperation Treaty (PCT), International Application No. PCT/US13/22195, Applicant Huawei Technologies Co., Ltd., date of mailing Oct. 30, 2015, 11 pages.

Apple, "Command Organization and Execution Model," https://developer.apple.com/library/ios/documentation/ Miscellaneous/Conceptual/MetalProgr . . . , downloaded May 14, 2015, pp. 1-10.

Chiosi, M., et al., "Network Functions Virtualisation (NFV); Network Operator Perspectives on Industry Progress," SDN and OpenFlow World Congress, Oct. 15-17, 2013, pp. 1-16.

Digiglio, J. et al., "High Performance, Open Standard Virtualization with NFV and SDN, a Joint Hardware and Software Platform for Next-Generation NFV and SDN Deployments," ©2013 Wind River Systems, Inc., Rev. Jun. 2013, 14 pages.

Durillo, J.J., "Programming GPUs," Lecture 8, OpenCL Events, Dec. 11, 2012, pp. 1-31.

Intel, "Intel BTS Solution," Communications Infrastructure Division, Embedded and Communications Group, Mar. 2011, pp. 1-62.

"Consolidating Communications and Networking Workloads onto one Architecture," White Paper, Intel Xeon Processor Equipment Platform Architecture, ©2010 Intel Corporation, pp. 1-10.

Ke, Y., "Intel Virtualization Technology Overview," Open Source Technology Center, Intel Software, SSG System Software Division, Jan. 5, 2009, pp. 1-35.

"Tessellation OS, A Real-Time, Responsive, High-Throughput Client Operating System for ManyCore," http://tessellation.cs.berkeley,edu/, downloaded Jun. 3, 2015, pp. 1-2.

"Wind River Open Virtualization Profile," Wind River Product Overview, ©2013 Wind River Systems, Inc., Rev. Jun. 2013, 4 pages.

"Wind River Hypervisor," Product Note, ©2013 Wind River Systems, Inc., Rev. Feb. 2013, 26 pages.

Intel White Paper, "Real-Time Virtualization in the Radio Access Network (RAN)," Aug. 2012, pp. 1-22.

Intel White Paper, "Intel's Next Generation Base Station Platform," Nov. 22, 2012, pp. 1-21.

Intel Transforming Communications, "Real Time Virtualization Update," Communications Infrastructure Division, Apr. 2013, pp. 1-15.

* cited by examiner

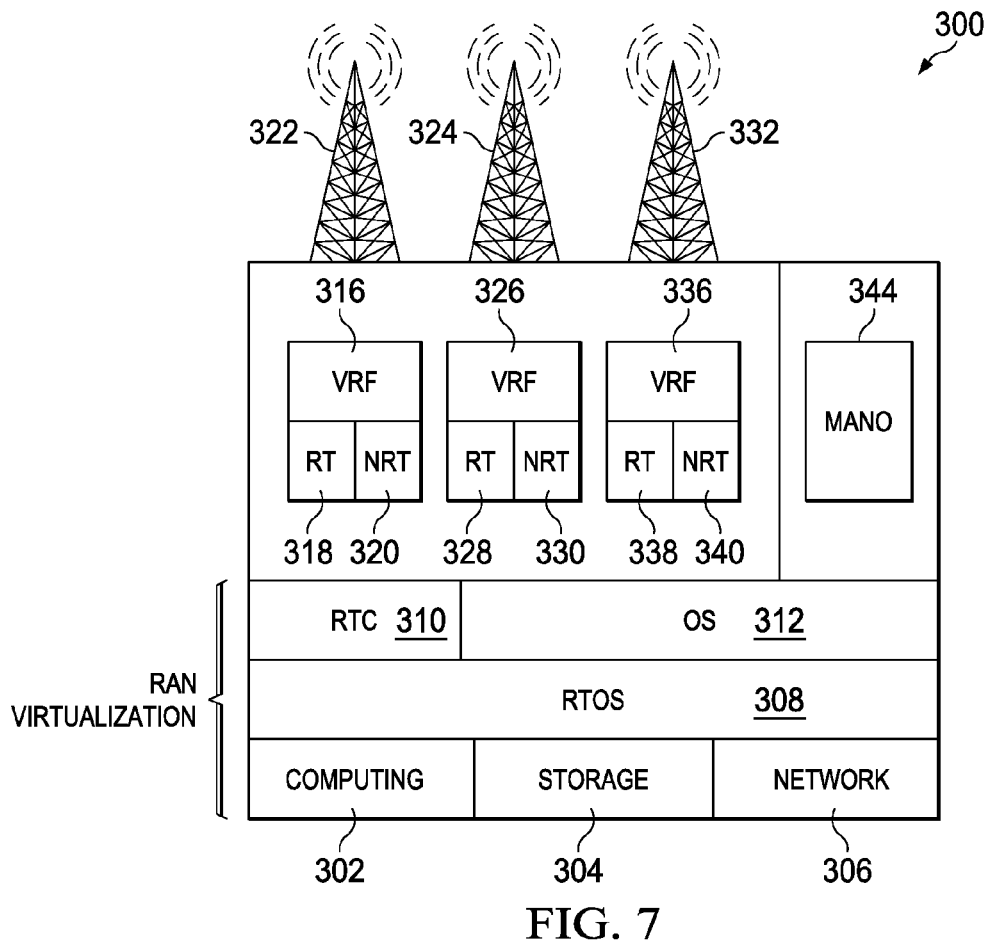
FIG. 7
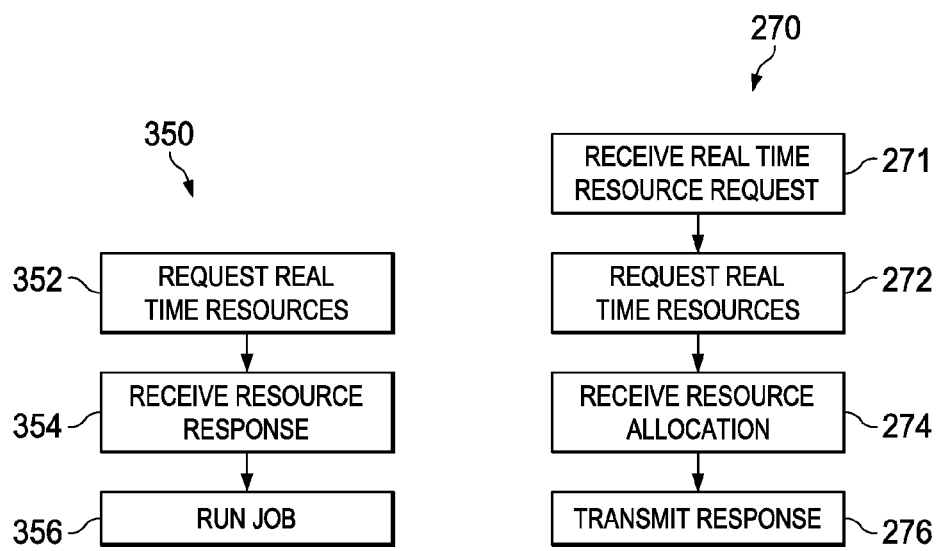
FIG. 8
FIG. 9

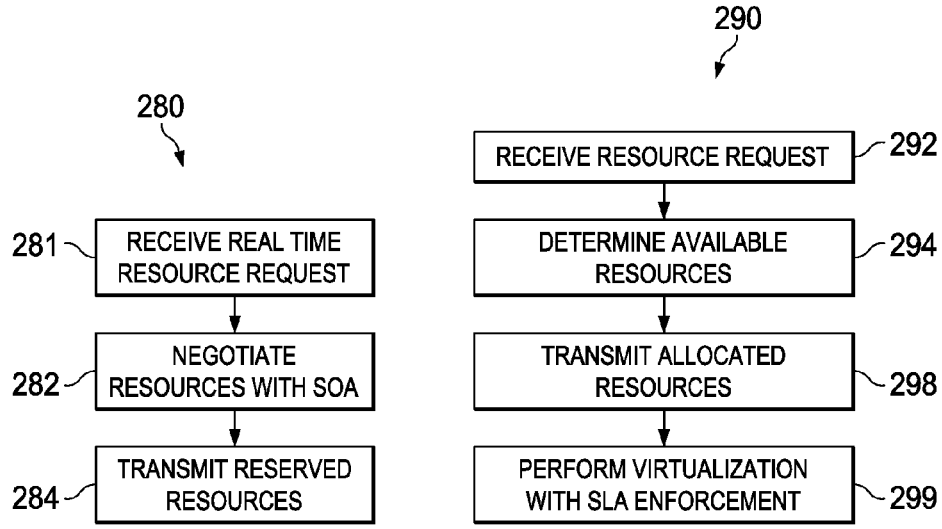
FIG. 10
FIG. 11
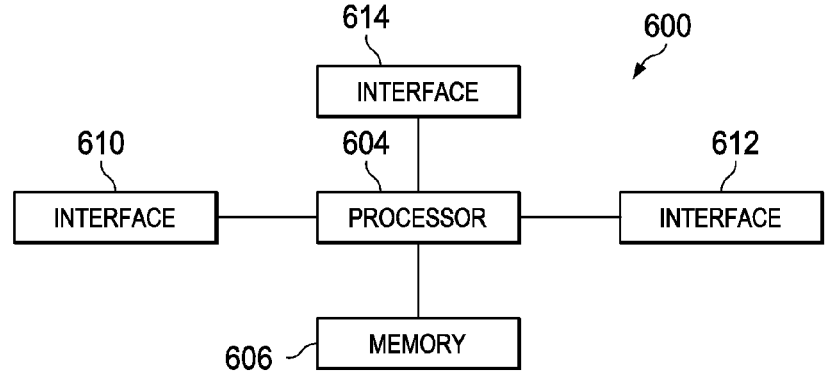
FIG. 12
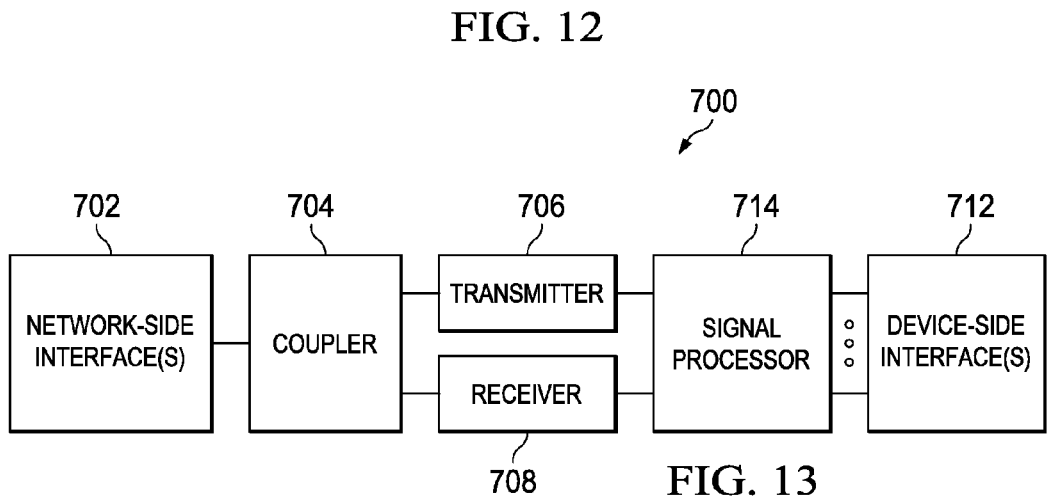
FIG. 13

SYSTEM AND METHOD FOR REAL TIME VIRTUALIZATION

This application claims the benefit of U.S. Provisional Application Ser. No. 62/008,382 filed on Jun. 5, 2014, and entitled "System and Method for Virtualized RAN Architecture," which application is hereby incorporated herein by reference.

TECHNICAL FIELD

The present invention relates to a system and method for virtualization, and, in particular, to a system and method for virtualized radio access network.

BACKGROUND

Network function virtualization (NFV) is a network architecture using virtualization technologies to virtualize classes of network node functions into building blocks which may be connected to create communications services. A virtualized network function (VNF) may include one or more virtual machines running different software and process on top of servers, switches, storage, and/or cloud computing infrastructure. Network function virtualization is moving from the core network to evolved packet core (EPC) to radio access technology. The access layer has unique real time and performance characteristics which may be problematic to implement on blade servers. In virtual radio access networks (vRAN), it is desirable to meet real time requirements of the access layer while achieving virtualization of the functionality.

SUMMARY

An embodiment system includes a plurality of compute modules and a first processor configured to implement a virtualization layer, where the virtualization layer is configured to support real time jobs. The system also includes a hardware support layer coupled between the plurality of compute modules and the virtualization layer, where the hardware support layer is configured to provide an interface between the virtualization layer and the plurality of compute modules.

An embodiment method includes receiving, from an application, a real time resource request for a plurality of hardware resources to perform a job in accordance with a real time requirement and requesting, to a first chip level logical resource manager, a first subset of the plurality of hardware resources. The method also includes receiving, from the first chip level logical resource manager, a first hardware resource corresponding to the first subset of the plurality of hardware resources.

An embodiment method includes using a hardware resource by a first job and transferring ownership of the hardware resource from the first job to an operating system, where the first job cannot access the hardware resource after transferring ownership of the hardware resource from the first job to the operating system. The method also includes transferring ownership of the hardware resource from the operating system to a second job and using the hardware resource by the second job after transferring ownership of the hardware resource from the operating system to the second job.

The foregoing has outlined rather broadly the features of an embodiment of the present invention in order that the detailed description of the invention that follows may be better understood. Additional features and advantages of embodiments of the invention will be described hereinafter, which form the subject of the claims of the invention. It should be appreciated by those skilled in the art that the conception and specific embodiments disclosed may be readily utilized as a basis for modifying or designing other structures or processes for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

For a more complete understanding of the present invention, and the advantages thereof, reference is now made to the following descriptions taken in conjunction with the accompanying drawings, in which:

FIG. 7 illustrates an embodiment virtualized network architecture;

FIG. 8 illustrates a flowchart of an embodiment method for real time virtualization performed by an application;

FIG. 9 illustrates a flowchart of an embodiment method for real time virtualization performed by an orchestration module;

FIG. 10 illustrates a flowchart of an embodiment method for real time virtualization performed by a chip level logical resource manager;

FIG. 11 illustrates a flowchart of an embodiment method for real time virtualization performed by a service oriented architecture (SOA);

FIG. 12 illustrates a block diagram of an embodiment processing system; and

FIG. 13 illustrates a block diagram of an embodiment a transceiver.

Corresponding numerals and symbols in the different figures generally refer to corresponding parts unless otherwise indicated. The figures are drawn to clearly illustrate the relevant aspects of the embodiments and are not necessarily drawn to scale.

DETAILED DESCRIPTION OF ILLUSTRATIVE EMBODIMENTS

It should be understood at the outset that although an illustrative implementation of one or more embodiments are provided below, the disclosed systems and/or methods may be implemented using any number of techniques, whether currently known or not. The disclosure should in no way be limited to the illustrative implementations, drawings, and techniques illustrated below, including the exemplary designs and implementations illustrated and described herein, but may be modified within the scope of the appended claims along with their full scope of equivalents.

In an example, a virtualized layer is on top of a base platform, for example an Intel® x86 architecture running a Linux™ operating system (OS). In may be problematic to meet real-time constraints when the base platform is optimized for non-real time applications. It may be problematic to virtualize real time performance onto a non-real time system.

In an example, virtualization is performed in Intel® Waddell Creek cloud radio access network (CRAN) for real time virtualization. This example provides some message management, but does not provide quality of service (QoS) guarantees in hardware, and does not provide message management in hardware. Also, it treats all accesses to real time components as virtual input/output (IO) from the virtualization layer, which is inefficient.

In another example, an Nvidia® graphics processing unit (GPU) architecture provides some job management and message management. However, the GPU architecture does not provide QoS guarantees in hardware, and virtualization is not supported.

An embodiment system for real time virtualization builds a real time base where non-real time components are virtualized on top of the real time components, while the system maintains real time performance for particular functions with real time requirements. In an embodiment, the real time components, including hardware accelerators, form a base which may be accessed in a service oriented manner. Hardware support of real time QoS is provided by job and message queue management. Also, memory management is provided by buffer management hardware, which facilitates ownership of memory buffers to be passed between real time threads and from real time to non-real time threads with clear ownership rules.

Figure 1:
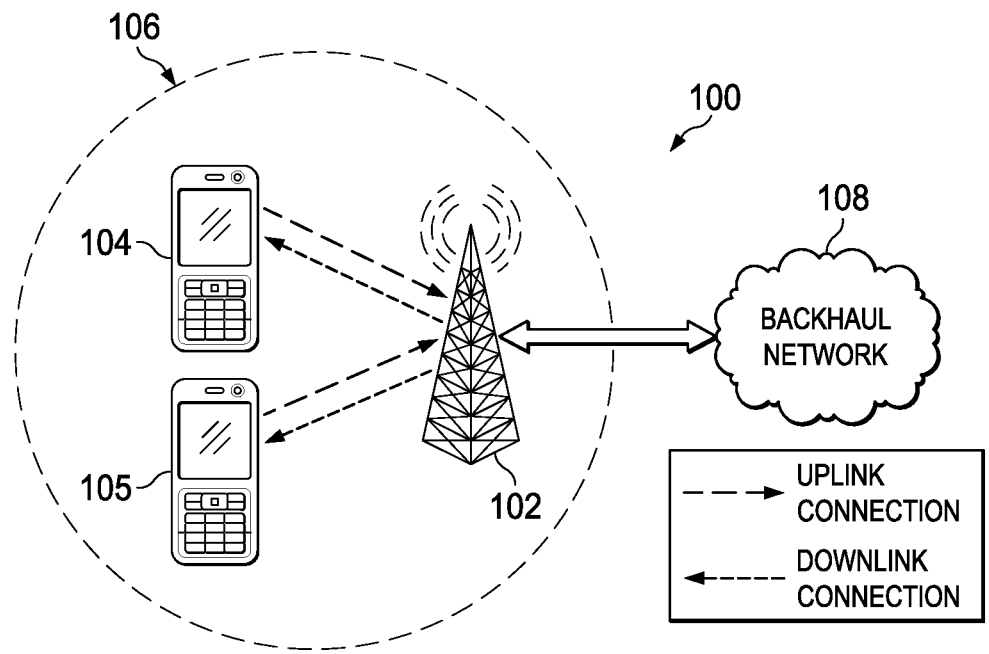
FIG. 1 illustrates a diagram of a wireless network for communicating data.

FIG. 1 illustrates network 100 for communicating data. Network 100 includes communications controller 102 having a coverage area 106, a plurality of user equipments (UEs), including UE 104 and UE 105, and backhaul network 108. Two UEs are depicted, but many more may be present. Communications controller 102 may be any component capable of providing wireless access by establishing uplink (dashed line) and/or downlink (dotted line) connections with UE 104 and UE 105, such as a base station, a NodeB, an enhanced nodeB (eNB), an access point, a picocell, a femtocell, relay node, and other wirelessly enabled devices. UE 104 and UE 105 may be any component capable of establishing a wireless connection with communications controller 102, such as cell phones, smart phones, tablets, sensors, etc. Backhaul network 108 may be any component or collection of components that allow data to be exchanged between communications controller 102 and a remote end. In some embodiments, the network 100 may include various other wireless devices, such as relays, etc.

Figure 2:
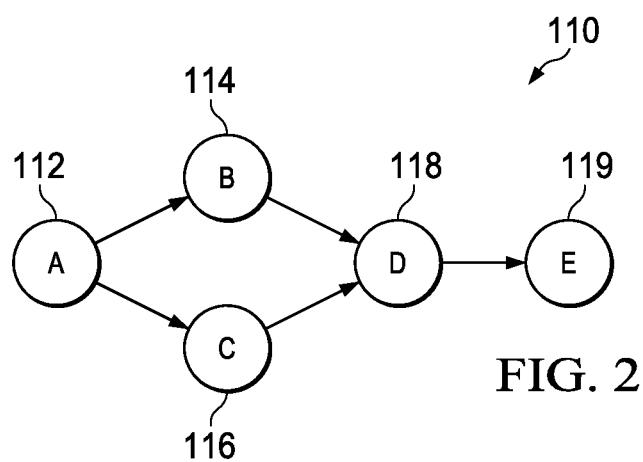
FIG. 2 illustrates an embodiment data flow diagram.

In an event driven system, the completion of tasks represent events, which may have real time deadlines. A new event is triggered when all of its dependencies (all events to be completed before the event is triggered) are met. FIG. 2 illustrates dataflow diagram 110 which shows a dataflow of operations where data is passed from one task to another. A vertex represents an operation or thread and an edge represents a unidirectional channel or queue to pass events, for example messages, from the source thread to the destination thread. Thread 112 passes events to thread 114 and thread 116. Also, threads 114 and 116 pass events to thread 118. Then, thread 118 passes events to thread 119. A dataflow diagram may be used to represent a computation performed in real time for setting real time deadlines.

Baseband processing, especially physical (PHY) layer applications, may have a variety of characteristics. For example, the baseband programming may have real time requirements subject to tight time constrains for each function. An example of baseband programming is standardized and embedded, for example guided by standards, such as Third Generation Partnership Project (3GPP) standards, where the data flows are inherent to the standards. The resources may be power constrained, and have close interactions with and control of hardware components. An example of baseband programming is distributed and heterogeneous. An example may be designed as system on a chip (SoC), which uses a variety of hardware and software infrastructure components. Tasks may embody fine and coarse grain parallelization. Baseband processing applications may be complex embedded software systems.

In an embodiment event driven system, three modems run concurrently. These modems share resources which are used sporadically and roughly periodically. Before run time, the modems break down their functions into a series of tasks which are connected by events, with a clear order of operation. Also, the modems have real time requirements for completion of one period of the modem, which may be broken down into a series of subsystem deadlines. This list of deadlines is referred to as a service level agreement (SLA).

The modems present the SLA to the event driven system, and the event driven system uses algorithms to calculate whether the event driven system may feasibly support all of the deadlines with the given resources. When the system can feasibly support the deadlines, it initializes the three modems, which run in an event driven fashion. When the system cannot feasibly support the deadlines, it rejects one or more of the requests for support to a higher level management function.

At run time, when there is contention for a shared resource, a decision is made on what to run next based on an algorithm which has been initiated by the SLA calculation algorithm to select a resource allocation to meet the feasibility calculations. An example event driven system is greedy, with real time guarantees for the three modems.

An embodiment system has a non-real time virtualized component, which is orchestrated on top of a real time virtualized layer, which sits on the event driven system. The virtualization layer converts resource requests from the non-real time functions into resource requests to the real time system. When a non-real time component attempts to reserve resources, for example an area of memory, the event driven real time system uses the existing SLA calculations to determine whether a resource is available to be reserved, and whether the real time modems can achieve their SLAs. When this can be achieved, the resource is reserved for the non-real time component. On the other hand, when this cannot be achieved, the non-real time component receives resources based on their availability. The non-real time component is isolated from the real time components by the virtualization layer and the SLA support mechanism, and will receive best effort service. The real time components continue to achieve their SLAs. A reservation may have a variety of meanings. The reservation may be for a fixed time, for example for the rest of the time slot, for a period of time with an unknown start time, for example for 20% of the slot, a statistical reservation, for example the resource is available for 20% of the time slot with a probability of 0.95, or another reservation type.

An embodiment real time event driven system is used as a base in a system with non-real time OS, middleware, and/or applications as virtualized software on top of the base platform, with isolation and SLAs. The base platform may meet the needs of both the real time and non-real time components.

An embodiment method of real time virtualization uses a SoC with associated software support, where the lowest layer of the SoC functionality is an event driven system, where memory sharing is supported by dynamic buffer management and messaging based communications. Isolation of the virtualized functionality is achieved by controlling the QoS provided to events running on shared resources. Resource scheduling QoS is explicitly derived from SLAs so each function agrees to the real time orchestration of the SoC. Event driven message passing and job scheduling provide a mechanism to support QoS and memory management in a real time communications system, where the SoC is shared among multiple tasks. Virtualized non-real time tasks which are running in a virtualized environment such as Linux™ are then abstracted on top of the real time base. Tasks are managed by a scheduler, which may be implemented in software, hardware, or a combination of hardware and software. An application programming interface (API) is used to abstract common virtualization system calls in the real time system so they achieve their SLAs while sharing resources. The effect of the virtualized tasks is isolated from the real time tasks running at the same time. Embodiments include a real time event driven system at the base of the architecture with a real time orchestration function which manages both the real-time tasks and the more traditional virtualized tasks, so they can all achieve their SLA goals. Thus, an embodiment includes a real time event driven system in a base layer with a real time orchestration function which manages both real time tasks and virtualized tasks for achievement of SLA goals.

In one example, non-real time functionality is layered on top of real time functionality, where real time functionality is supported by the hardware. Real time hardware is at the bottom layer. To perform a non-real time task, a large real time job is provisioned, with non-real time jobs within the large job. Thus, the non-real time job runs inside a real time container. Also, message queues which support real time are at the bottom of the architecture. Ownership of resources is passed between real time jobs, non-real time jobs, and the operating system with clear ownership rules. To transfer ownership from a real time job to a non-real time job, the ownership is first passed from the real time job to the real time operating system, and then from the operating system to the non-real time job. Similarly, to transfer ownership from a non-real time job to a real time job, ownership is passed from the non-real time job to the operating system, and then from the operating system to the real time job.

Figure 3:
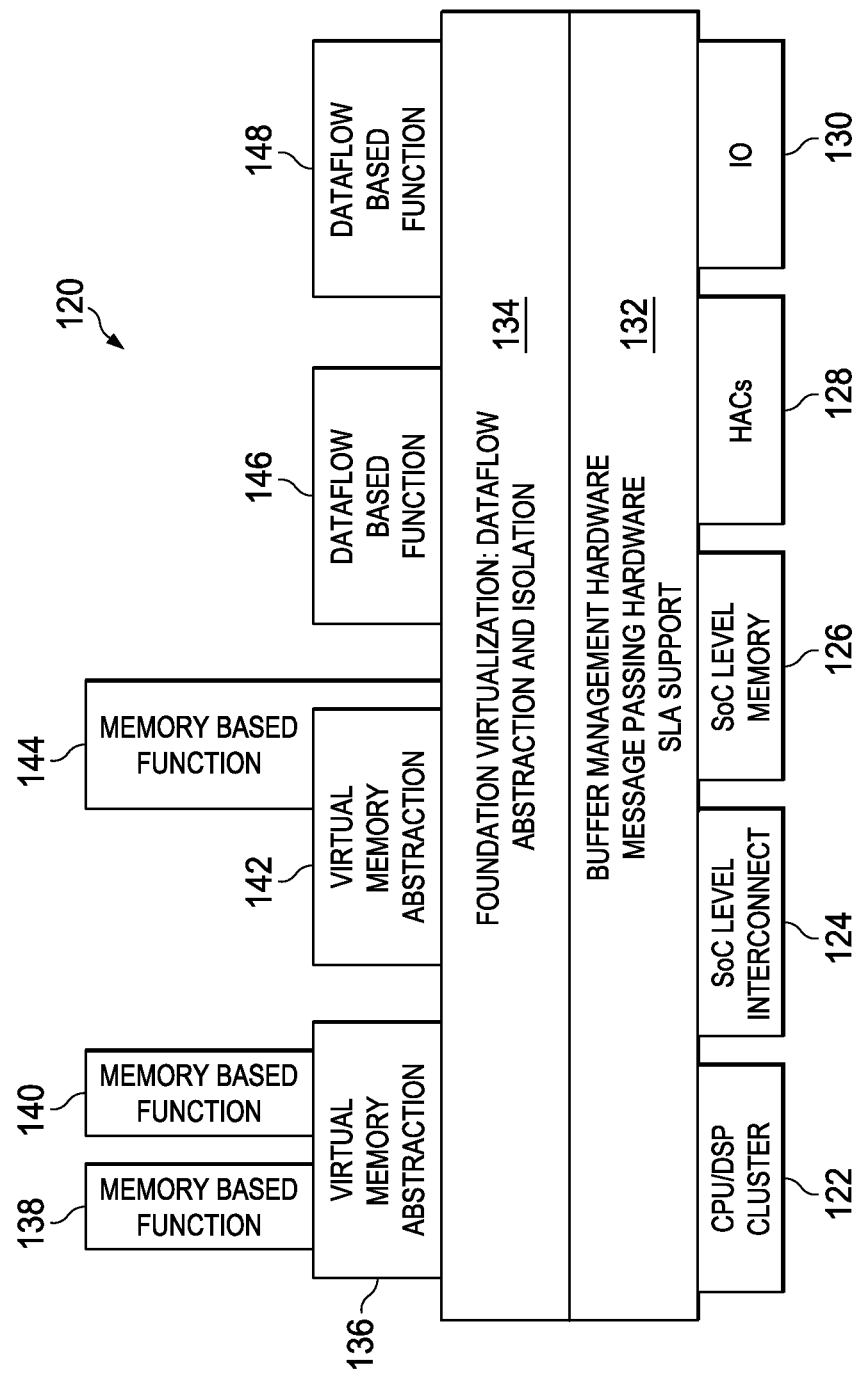
FIG. 3 illustrates an architecture stack diagram of an embodiment architecture.

FIG. 3 illustrates architectural stack diagram 120 for an embodiment real time virtualized architecture. Real time components, including accelerators in hardware, form a base platform which may be accessed in a service oriented manner. Hardware support of real time QoS is provided with job and message queue management. In an example, a message is defined as the data in the message and metadata associated with the data, which, for example, describes the size, priority, isolation, and/or QoS. Ownership of memory buffers is passed between real time threads and between real time threads and non-real time threads with clear ownership rules. Communications between jobs in the system is peer-to-peer. This may prevent bottlenecks in the software and facilitates good real time isolation properties and scalability.

The compute units for performing the computation are at the bottom level of the architecture. Compute units include central processing unit (CPU)/digital signal processor (DSP)/GPU cluster 122, SoC level interconnect 124, SoC level memory 126, hardware accelerators (HACs) 128, and IO peripherals 130. The compute units operate in real time. CPU/DSP cluster 122 performs computations, and SoC level memory 126 is non-uniform memory. The compute units interact with software and hardware.

Above the compute units is hardware accelerator 132, which interfaces with the compute units and software. Hardware accelerator 132 supports real time management of operations while isolating the operations in space and time. Buffer management hardware, message passing hardware, and SLA support are included in the hardware accelerator. In another example, SLA support, buffer management, and message passing are implemented in software. Hardware accelerator 132 performs real time management of the compute units as well as data management.

Foundation virtualization layer 134, above hardware accelerator 132, is the software interface to the real time hardware. The foundation virtualization is a low level API abstraction not based on virtualization layers, for example used with x86™ or ARM™ based platforms. The foundation virtualization layer maintains real time in functions which require real time and provide a software interface for real time and non-real time functions. Real time functions, non-real time functions, and mixed functions are supported. The buffer management hardware provides memory management, which facilitates the ownership of memory buffers being passed between real time threads and between real time threads and non-real time threads with clear ownership rules.

Database functions 146 and 148 are real time jobs which use real memory resources. Real time jobs may be directly plugged in to foundation virtualization layer 134. Also, real time jobs are run in a physical hardware environment where data buffers are created, allocated, and destroyed in a physical memory space. Message passing is used to coordinate real time jobs.

Virtual memory abstraction layers 136 and 142 provide interfaces to non-real time jobs which use non-real time memory which is virtualized on real time memory. The virtual memory is layered on top of the messages. In one example, there is message passing using a dataflow architecture. In another example, a tessellation approach is used. A tessellation operating system uses space-time partitioning across the space of hardware resources. The technology used to guarantee real time service SLAs may be hidden to the higher layer virtualization technology.

Memory based functions 138 and 140 are non-real time functions which interface with virtual memory abstraction layers 136. There may be one, two, or more layers of virtualizations for non-real time jobs, which are run with a virtualized memory abstraction on top of the real time system. The virtualization memory abstraction supports virtualization rather than real time.

Memory based function 144 is a hybrid real time and non-real time function which performs both real time calls and non-real time calls. It accesses real time directly through foundation virtualization layer 134 and non-real time through virtual memory abstraction layer 142. Memory based function 144 can run real time jobs, but is not itself real time. The non-real time function may access real time directly.

A virtualizable operating system, such as Linux™, is virtualized on top of the real time system. The operating system may use SLA guarantees within the real time system, so a real time system may simultaneously run real time and non-real time tasks. The virtualized operating system may access real time APIs. There is isolation in the virtualization software which is ensured by the real time layer.

SLAs and other QoS are supported by queue management from the real time and non-real time processing systems. Queueing supports message ownership of memory between real time jobs and non-real time jobs. Real time RAN components are orchestrated by higher level software.

Figure 4:
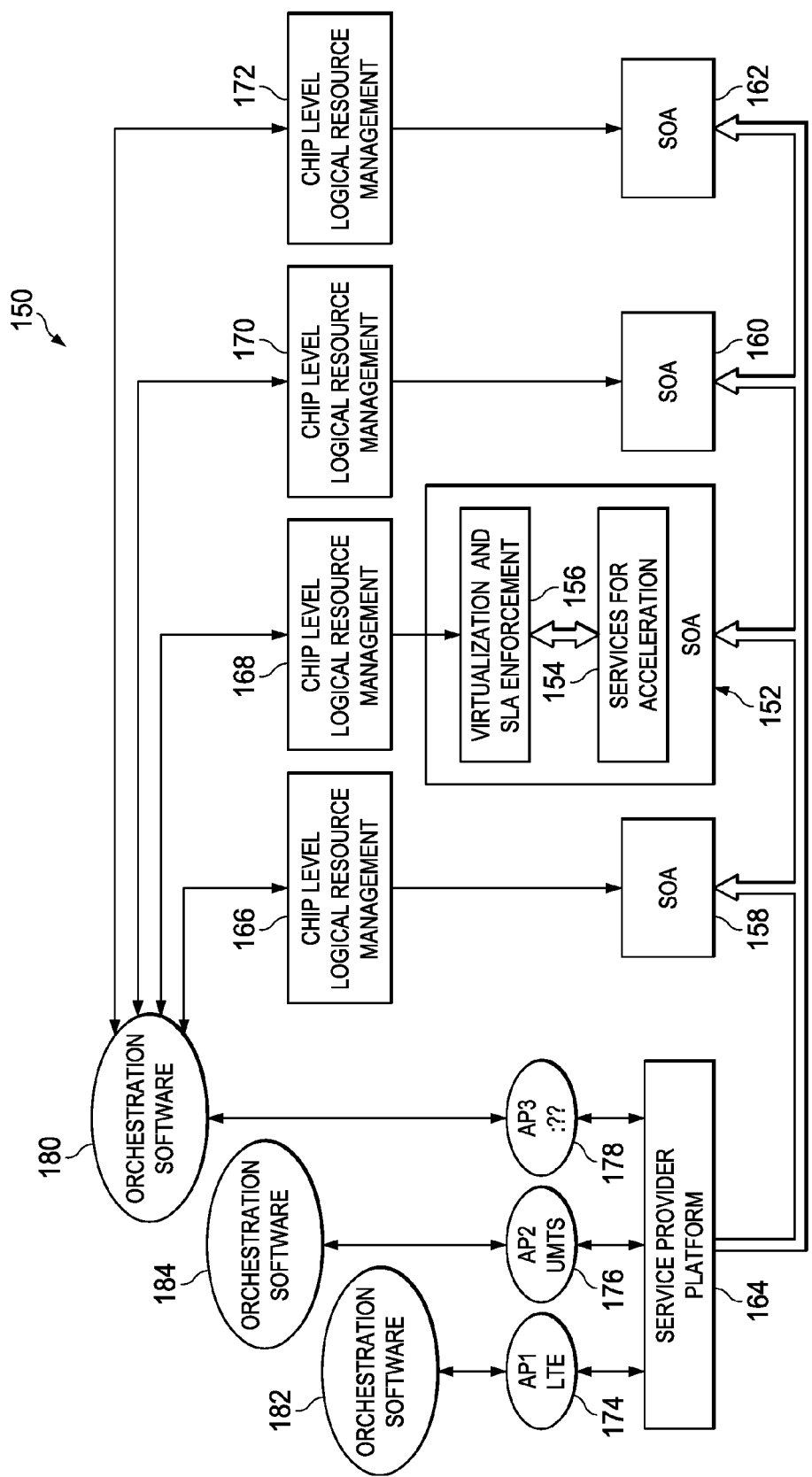
FIG. 4 illustrates a chart of an embodiment application interface for orchestration.

FIG. 4 illustrates application interface for orchestration 150. Service oriented architectures (SOAs) 158, 152, 160, and 162 include virtualization and SLA enforcement 156, which enforces virtualization in real time, and services for acceleration 154, which provides acceleration services. The SLA is enforced by assigning resources to applications to meet the SLAs for the applications. When an application attempts to use an unassigned resource, or a resource assigned to another application, or attempts to use a resource which is assigned, but not for the time of the attempted access, it is denied. This isolates the resources to enforce the SLA. Hardware and/or software maintain the virtualization and real time services for SLA enforcement.

Service provider platform 164 interfaces between the SOAs and applications (APs) 174, 176, and 178. AP 174 is a long term evolution (LTE) AP, AP 176 is a universal mobile telecommunications system (UMTS) AP, and AP 178 is another type of AP, such as another wireless applications, or non-wireless applications, such as video coding.

The APs communicate with orchestration modules 182, 184, and 180, which are software orchestration modules. There may be one, two, three, or more orchestration modules. The orchestration modules negotiate with chip level logical resource managers 166, 168, 170, and 172 to determine which resources are available for the applications. The orchestration module receives a resource request, for example to perform a fast Fourier transform (FFT) in a given time period, or that it needs a particular number of multiple-input multiple-output (MIMO) ports, and responds with particular hardware resources to be assigned to perform the task. Various pieces of hardware may be tied together to achieve the real time requirements by the orchestration module. Connections are set up, including service chaining, which connects software to memory. Additionally, the orchestration modules determine whether there are sufficient available resources to achieve the SLA. When there are not sufficient resources, the orchestration module informs the application that it is not approved for the resources.

Chip level logical resource managers 166, 168, 170, and 172 interface with both the SOAs and the orchestration software. They reserve particular hardware resources to be used to meet the SLAs. The chip level logical resource management is software in-the-loop which sets up virtualization, including parameters and partitions. The chip level logical resource manager is closely tied to the underlying hardware. In an example, there is one chip level logical resource manager per SOA, to avoid double booking of resources, or having a reservation interrupted.

When an application wants to run a real time job, it calls the orchestration software. The orchestration software then calls the chip level logical resource manager to negotiate an agreement in terms of which resources are going to be used and what the real time characteristics are going to be, with the SOAs. The chip level logical resource management module requests services from the SOA, which are reserved with real time constraints and real time guarantees. The resource may then be used by the application via service provider platform 164.

Figure 5:
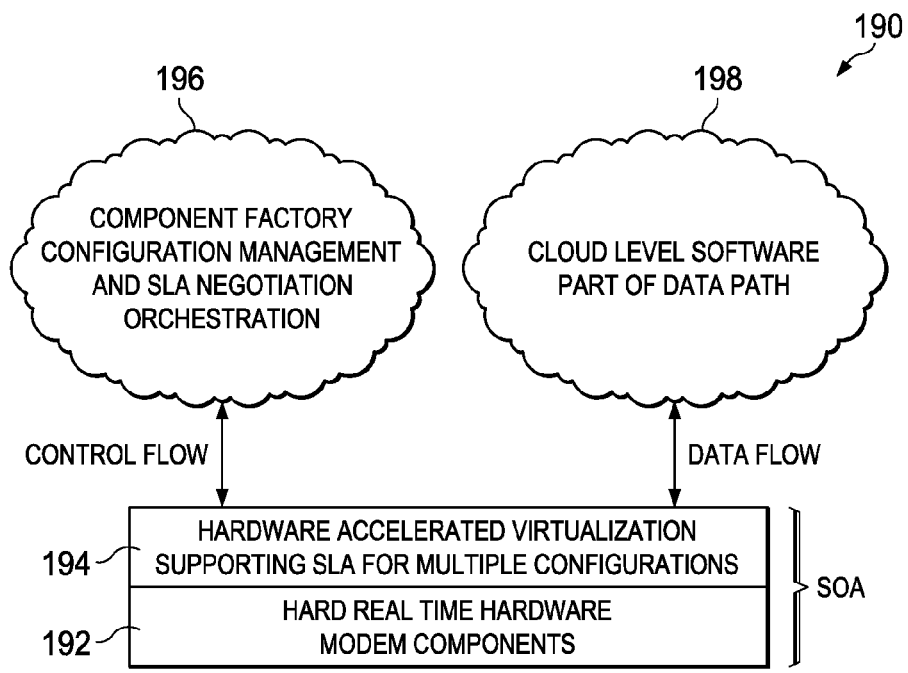
FIG. 5 illustrates an embodiment cloud-based system.

FIG. 5 illustrates system 190 which may be used in a cloud based system. Real time hardware modem components 192 are in the bottom layer, below hardware accelerated virtualization 194.

Hardware accelerated virtualization 194 supports SLA for multiple configurations. The SoC is viewed as a collection of services in an SOA. The services may be accessed by multiple sources in the cloud and orchestrated to produce a larger radio access service, because the SLA guarantees of the SOA facilitate multiple sources receiving SLA guarantees from the SoC. Hardware is at the bottom layer, with virtualization on top of the real time support. Control flow is used between hardware accelerated virtualization 194 and component factory configuration management and SLA negotiation orchestration 196. There is data flow between hardware accelerated virtualization 194 and cloud level software part of data path 198.

The orchestration software interfaces with chip level logical resource managers 166, 168, 170, and 172. Resources are negotiated between jobs based on the SLA calculation.

An embodiment architecture supports flexible solutions in small cell, cloud radio access network (CRAN), distributed CRAN, fog, etc., with high efficiency, because there is scalability from peer-to-peer connectivity. In an embodiment, isolation is accelerated in hardware. Another embodiment uses peer-to-peer memory management and message passing with isolation and strong ownership rules for messages. Job management may be used with QoS for efficient use of resources in real time. Isolation may be achieved with real time granularity in hardware.

Figure 6:
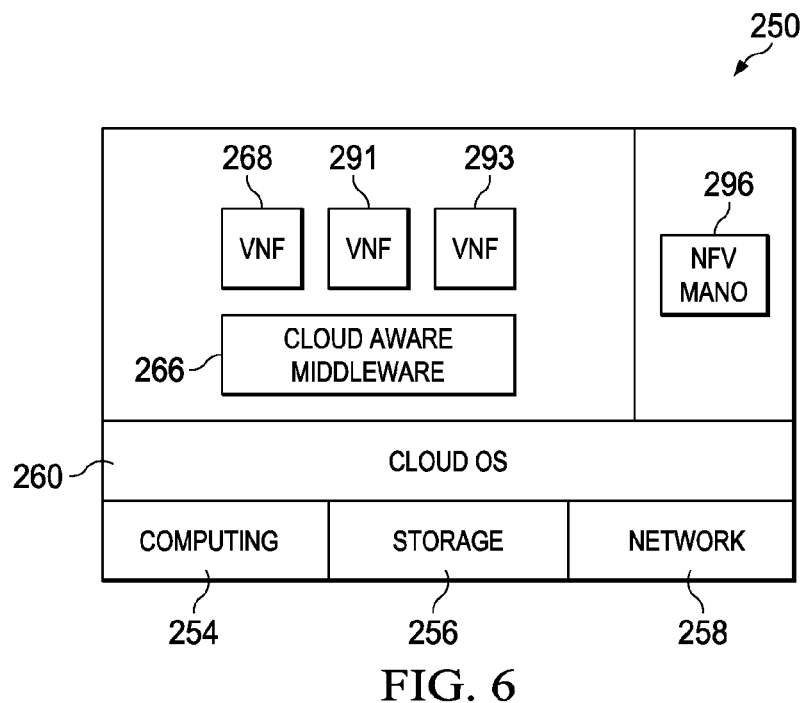
FIG. 6 illustrates a virtualized network architecture.

FIG. 6 illustrates virtualized network architecture 250. Virtualized network architecture 250 does not consider real time events when applied to virtual RAN. At the bottom level is the hardware, including computing module 254, storage 256, and network 258.

Above the hardware level is cloud OS 260, which virtualizes the underlying hardware.

Cloud aware middleware 266 provides an interface between cloud OS 260 and virtualized network functions (VNFs) 268, 291, and 293. The VNF is a network function virtualization (NFV) module not running in real time. Cloud aware middleware 266 provides an interface between cloud OS 260 and VNFs 268, 291, and 293. The VNF is a virtualized network function that is not running in real time.

NFV management and orchestration (MANO) 296 also interfaces with cloud OS 260 to provide management orchestration. The NFV MANO pulls various aspects together to configure permissions in the cloud OS.

FIG. 7 illustrates virtualized platform 300 for virtualized RAN. Hardware is at the bottom layer, including computing unit 302, storage 304, and network 306. Real time operating system 308 is above the hardware.

Next is real time controller (RTC) 310 and OS 312. OS 312 handles the non-real time virtualization, while RTC 310 handles the real time virtualization, along with real time operating system (RTOS) 308. RTOS 308 is a service provider which provides real time services.

MANO 344, above OS 321, provides coordination and orchestration.

Virtual real time functions (VRFs) 316, 326, and 336 contain real time (RT) functions 318, 328, and 338, respectively, and non-real time (NRT) functions 320, 330, and 340. The VRFs are coupled to antennas 322, 324, and 332. VRFs 316, 326, and 336 are functions which contain RT functions 318, 328, and 338, respectively, and may contain NRT functions 320, 330, and 340, respectively. The VRFs are coupled to antennas 322, 324, and 332.

In this example, there are communications interfaces between the different layers and entities. This architecture facilitates the separation of RT and NRT communications.

For example, there is a communication interface or link between the RT part of the VRF and the RTC, and a link between the NRT part of the VRF and the OS. For example, there is a link between one VRF and another VRF, which may have separate paths to the RT and NRT parts of the VRF. Interfaces between the NFV MANO and VRF may have separate paths for RT and NRT aspects. In other examples, there are communication interfaces between entities of non-adjacent layers. In another example, there is a single physical interface without separate paths.

In one example, a virtual carrier for a mobile virtual network operator (MVNO) implements the VNF as a virtual carrier. Multiple MVNOs may share the physical resources of the RAN via virtual carriers. The usage of virtual carriers implies that at least a portion of the resources of the physical carrier are grouped together as a carrier.

FIG. 8 illustrates flowchart 350 for an embodiment method of real time virtualization performed by an application. The application attempts to run a real time job. Initially, in step 352, the application requests real time resources from an orchestration module. The application requests the resources it wants, as well as its real time requirements. The application frames its request by indicating the task it wants to perform and a deadline. For example, the application may request performing an FFT in a period of time or a particular number of MIMO ports.

Next, in step 354, the application receives a response from the orchestration module. The response indicates whether the orchestration module is able to assign sufficient resources for the application to meet its real time requirement. When the real time requirements are able to be met, the orchestration module transmits the assigned resources, in the form of specific hardware resources which have been allocated to the job at specific times. The resource allocation has been negotiated between chip level logical resource managers and SOAs.

Finally, in step 356, the application runs the job by communicating with the SOAs though a service provider platform. The assigned hardware resources are used in performing the job. Additional resources may not be used by the job. When the applications requests resources which have not been assigned to it, it is denied these resources. The application may run multiple jobs after reserving the resources once.

FIG. 9 illustrates flowchart 270 for an embodiment method of real time virtualization performed by an orchestration module. Initially, in step 271, the orchestration module receives a real time resource request from an application. The request indicates the resources requested by the application, as well as the real time requirement for the job. The request is in the form of a job and a requirement, such as to perform an FFT in a timeframe, or for a number of MIMO ports.

Then, in step 272, the orchestration module requests real time resources from chip level logical resource managers. Several chip level logical resource management modules associated with different SOAs may be used to achieve the requested resources.

Next, in step 274, the orchestration module receives resource allocations from the chip level logical resource managers. The resource allocations have been negotiated by the chip level logical resource management with the SOAs. This information is the details of the particular hardware resources which have been assigned, such as particular memory space and processors, at particular times. The orchestration module determines whether the allocated resources are sufficient to meet the real time requirement of the job. When there are sufficient resources, the orchestration module selects resources sufficient to meet the SLA, and informs the chip level logical resource managers.

Finally, in step 276, the orchestration layer transmits a response to the application. The response indicates whether the SLA of the job is able to be met. When the SLA is able to be met, the specific resource allocation is also transmitted to the application. The specific resource allocation is the details of all of the particular hardware resources which have been assigned to the job, such as particular memory space and processors, at particular times.

FIG. 10 illustrates flowchart 280 for an embodiment method of real time virtualization performed by a chip level logical resource manager. Initially, in step 281, the chip level logical resource manager receives a resource request from an orchestration module, for example in the form of types of resources requested. For example, a particular amount of memory or computing resources may be requested.

In step 282, the chip level logical resource manager negotiates with the SOA on resources. The real time considerations are considered in allocating resources, so sufficient resources, but not more, are allocated to a job to meet an SLA. Resources are reserved for the job. In one example, the chip level logical resource manager sends some configuration directives to the SOA.

Finally, in step 284, the chip level logical resource manager transmits the reserved resources to the orchestration. The particular hardware resources, for example a particular portion of memory at a given time, or a particular processor during a period of time, are conveyed.

FIG. 11 illustrates flowchart 290 for an embodiment method of real time virtualization performed by an SOA. Initially, in step 292, the SOA receives a resource request from an associated chip level logical resource manager. The request indicates SOA resources to be reserved, such as an amount of memory, or a processing capability.

Next, in step 294, the SOA determines whether sufficient resources are available, and, if so, which resources are available. When resources are available, sufficient hardware resources are allocated to maintain the SLA for the job.

In step 298, the allocated resources are transmitted to the chip level logical resource manager. The particular allocated resources being reserved are transmitted.

Finally, in step 299, the SOA performs virtualization with SLA enforcement using the resources reserved in step 294. When an application attempts to use unreserved resources, the application is denied these resources. Thus, the SLA is enforced while isolating resources.

FIG. 12 illustrates a block diagram of an embodiment processing system 600 for performing methods described herein, which may be installed in a host device. As shown, the processing system 600 includes a processor 604, a memory 606, and interfaces 610-614, which may (or may not) be arranged as shown in FIG. 12. The processor 604 may be any component or collection of components adapted to perform computations and/or other processing related tasks, and the memory 606 may be any component or collection of components adapted to store programming and/or instructions for execution by the processor 604. In an embodiment, the memory 606 includes a non-transitory computer readable medium. The interfaces 610, 612, 614 may be any component or collection of components that allow the processing system 600 to communicate with other devices/components and/or a user. For example, one or more of the interfaces 610, 612, 614 may be adapted to communicate data, control, or management messages from the processor 604 to applications installed on the host device and/or a remote device. As another example, one or more of the interfaces 610, 612, 614 may be adapted to allow a user or user device (e.g., personal computer (PC), etc.) to interact/communicate with the processing system 600. The processing system 600 may include additional components not depicted in FIG. 12, such as long term storage (e.g., non-volatile memory, etc.).

In some embodiments, the processing system 600 is included in a network device that is accessing, or part otherwise of, a telecommunications network. In one example, the processing system 600 is in a network-side device in a wireless or wireline telecommunications network, such as a base station, a relay station, a scheduler, a controller, a gateway, a router, an applications server, or any other device in the telecommunications network. In other embodiments, the processing system 600 is in a user-side device accessing a wireless or wireline telecommunications network, such as a mobile station, a user equipment (UE), a personal computer (PC), a tablet, a wearable communications device (e.g., a smartwatch, etc.), or any other device adapted to access a telecommunications network.

In some embodiments, one or more of the interfaces 610, 612, 614 connects the processing system 600 to a transceiver adapted to transmit and receive signaling over the telecommunications network. FIG. 13 illustrates a block diagram of a transceiver 700 adapted to transmit and receive signaling over a telecommunications network. The transceiver 700 may be installed in a host device. As shown, the transceiver 700 comprises a network-side interface 702, a coupler 704, a transmitter 706, a receiver 708, a signal processor 710, and a device-side interface 712. The network-side interface 702 may include any component or collection of components adapted to transmit or receive signaling over a wireless or wireline telecommunications network. The coupler 704 may include any component or collection of components adapted to facilitate bi-directional communication over the network-side interface 702. The transmitter 706 may include any component or collection of components (e.g., up-converter, power amplifier, etc.) adapted to convert a baseband signal into a modulated carrier signal suitable for transmission over the network-side interface 702. The receiver 708 may include any component or collection of components (e.g., down-converter, low noise amplifier, etc.) adapted to convert a carrier signal received over the network-side interface 702 into a baseband signal. The signal processor 710 may include any component or collection of components adapted to convert a baseband signal into a data signal suitable for communication over the device-side interface(s) 712, or vice-versa. The device-side interface(s) 712 may include any component or collection of components adapted to communicate data-signals between the signal processor 710 and components within the host device (e.g., the processing system 600, local area network (LAN) ports, etc.).

The transceiver 700 may transmit and receive signaling over any type of communications medium. In some embodiments, the transceiver 700 transmits and receives signaling over a wireless medium. For example, the transceiver 700 may be a wireless transceiver adapted to communicate in accordance with a wireless telecommunications protocol, such as a cellular protocol (e.g., long-term evolution (LTE), etc.), a wireless local area network (WLAN) protocol (e.g., Wi-Fi, etc.), or any other type of wireless protocol (e.g., Bluetooth, near field communication (NFC), etc.). In such embodiments, the network-side interface 702 comprises one or more antenna/radiating elements. For example, the network-side interface 702 may include a single antenna, multiple separate antennas, or a multi-antenna array configured for multi-layer communication, e.g., single input multiple output (SIMO), multiple input single output (MISO), multiple input multiple output (MIMO), etc. In other embodiments, the transceiver 700 transmits and receives signaling over a wireline medium, e.g., twisted-pair cable, coaxial cable, optical fiber, etc. Specific processing systems and/or transceivers may utilize all of the components shown, or only a subset of the components, and levels of integration may vary from device to device.

While several embodiments have been provided in the present disclosure, it should be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and could be made without departing from the spirit and scope disclosed herein.

What is claimed is:

1. A system comprising:
a first processor configured to implement a virtualization layer, wherein the virtualization layer is configured to support real time jobs and to convert resource requests from non-real time jobs into real time resource requests;
a hardware support layer coupled between a plurality of modules and the virtualization layer, wherein the hardware support layer is configured to provide an interface between the virtualization layer and the plurality of modules,
a second processor configured to implement a memory based function; and
a third processor configured to implement a virtual memory abstraction that provides interfaces to non-real time jobs and is coupled between the memory based function and the virtualization layer.

2. The system of claim 1, wherein the hardware support layer comprises buffer management hardware.

3. The system of claim 1, wherein the hardware support layer comprises message passing hardware.

4. The system of claim 1, wherein the hardware support layer comprises service level agreement (SLA) support.

5. The system of claim 1, wherein the plurality of modules comprises:
a system on a chip (SoC) level interconnect; and
SoC level memory.

6. The system of claim 1, wherein the plurality of modules comprises hardware accelerators.

7. The system of claim 1, wherein the virtualization layer is configured to perform dataflow abstraction and isolation.

8. The system of claim 1, further comprising a fourth processor configured to implement a dataflow based function, wherein the fourth processor is directly coupled to the virtualization layer.

9. The system of claim 1, wherein the virtualization layer is a foundation virtualization layer.

10. A method comprising:
receiving, from an application, a real time resource request for hardware resources to perform a job, wherein the real time resource request comprises a real time requirement for the job, wherein the job is a hybrid real time and non-real time job, and wherein the job is configured to perform real time accesses directly through a foundation virtualization layer and to perform non-real time accesses through a virtual memory abstraction layer;
requesting, to a first chip level logical resource manager, a first subset of a plurality of hardware resources to perform the job; and
receiving, from the first chip level logical resource manager, a first hardware resource corresponding to the first subset of the plurality of hardware resources.

11. The method of claim 10, further comprising:
requesting, to a plurality of chip level logical resource managers, the plurality of hardware resources, wherein the plurality of chip level logical resource managers comprises the first chip level logical resource manager; and
receiving, from the plurality of chip level logical resource managers, a plurality of allocated hardware resources to perform the job, wherein the plurality of allocated hardware resources comprises the first hardware resource.

12. The method of claim 11, further comprising:
determining whether the plurality of allocated hardware resources is sufficient to perform the job in accordance with the real time requirement for the job; and
transmitting, to the application, a message indicating whether the plurality of allocated hardware resources is sufficient to perform the job in accordance with the real time requirement for the job.

13. The method of claim 10, wherein the application is a wireless application.

14. A method comprising:
using a hardware resource by a first job;
transferring ownership of the hardware resource from the first job to an operating system, wherein the first job cannot access the hardware resource after transferring ownership of the hardware resource from the first job to the operating system, and wherein the first job is a non-real time job within a real time job;
transferring ownership of the hardware resource from the operating system to a second job; and
using the hardware resource by the second job after transferring ownership of the hardware resource from the operating system to the second job.

15. The method of claim 14, further comprising:
receiving a resource request for the first job;
allocating the hardware resource to the first job; and
transmitting the hardware resource before using the hardware resource by the first job.

16. The method of claim 14, further comprising enforcing service level agreements (SLAs).

17. The method of claim 14, wherein the second job is a non-real time job.

18. The method of claim 14, wherein the second job is a real time job.

* * * * *